United States Patent
Fujimaki et al.

(10) Patent No.: US 8,943,511 B2
(45) Date of Patent: Jan. 27, 2015

(54) PARALLEL ALLOCATION OPTIMIZATION DEVICE, PARALLEL ALLOCATION OPTIMIZATION METHOD, AND COMPUTER-READABLE RECORDING MEDIUM

(71) Applicant: NEC Corporation, Minato-ku, Tokyo (JP)

(72) Inventors: Ryohei Fujimaki, Minato-ku (JP); Kouhei Hayashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 303 days.

(21) Appl. No.: 13/653,464

(22) Filed: Oct. 17, 2012

(65) Prior Publication Data

US 2013/0326532 A1  Dec. 5, 2013

Related U.S. Application Data

(60) Provisional application No. 61/653,629, filed on May 31, 2012.

(51) Int. Cl.
G06F 9/46 (2006.01)

(52) U.S. Cl.
USPC .......... 718/104; 718/100; 718/101; 718/102; 718/105; 718/107

(58) Field of Classification Search
None
See application file for complete search history.

(56) References Cited

U.S. PATENT DOCUMENTS

| | | | |
|---|---|---|---|
| 2004/0078407 A1* | 4/2004 | Naslund et al. | 708/492 |
| 2010/0241683 A1* | 9/2010 | Nakanishi | 708/520 |
| 2012/0246533 A1* | 9/2012 | Palotai | 714/746 |
| 2013/0212451 A1* | 8/2013 | Nemati Anaraki et al. | 714/773 |

OTHER PUBLICATIONS

Kimikazu Kato, Tikara Hosino; Solving k-Nearest Neighbor Problem on Multiple Graphics Processors; Nihon Unisys, Ltd.; Jul. 15, 2012.*
John Duchi, Yoram Singer; Efficient Online and Batch Learning Using Forward Backward Splitting; Journal of Machine Learning Research; Published Dec. 2009.*
International Search Report dated Jun. 11, 2013 issued by International Searching Authority in corresponding International Application No. PCT/JP2013/002899.
Koichi Kato, "Algorithm for Recommendation System on Graphics Processor", Technical Reports Unisys Technology Review, Jun. 30, 2010, vol. 30 No. 1, pp. 41-52.
John Duchi, et al., "Efficient Online and Batch Learning Using Forward Backward Splitting", Journal of Machine Learning Research, 2009, pp. 2899-2934, vol. 10.

* cited by examiner

Primary Examiner — Emerson Puente
Assistant Examiner — Dong Kim
(74) Attorney, Agent, or Firm — Sughrue Mion, PLLC

(57) ABSTRACT

A parallel allocation calculating unit calculates a parallel allocation candidate which is an element candidate in target data allocated per processing performed in parallel. A parallel calculation amount estimation processing unit estimates the calculation amount required for parallel processing when a parallel allocation candidate is allocated, based on a nonzero element count in the target data. An optimality decision processing unit decides whether or not the parallel allocation candidate is optimal based on the calculated calculation amount, and allocates the optimal element per processing performed in parallel.

6 Claims, 4 Drawing Sheets

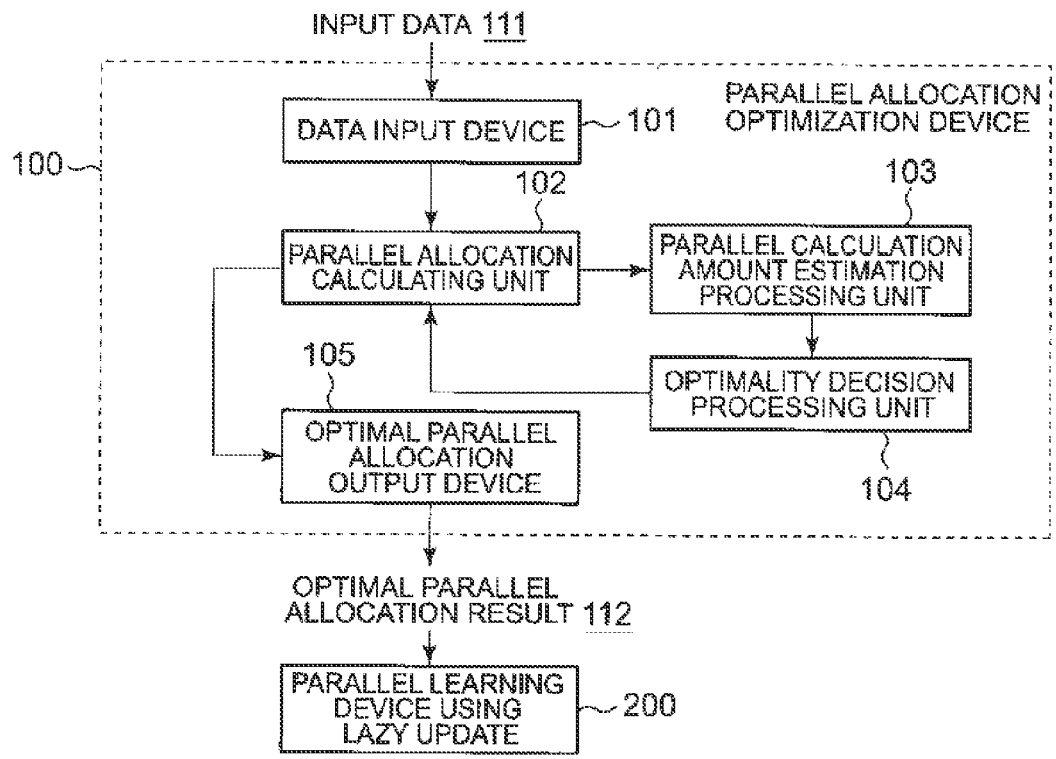
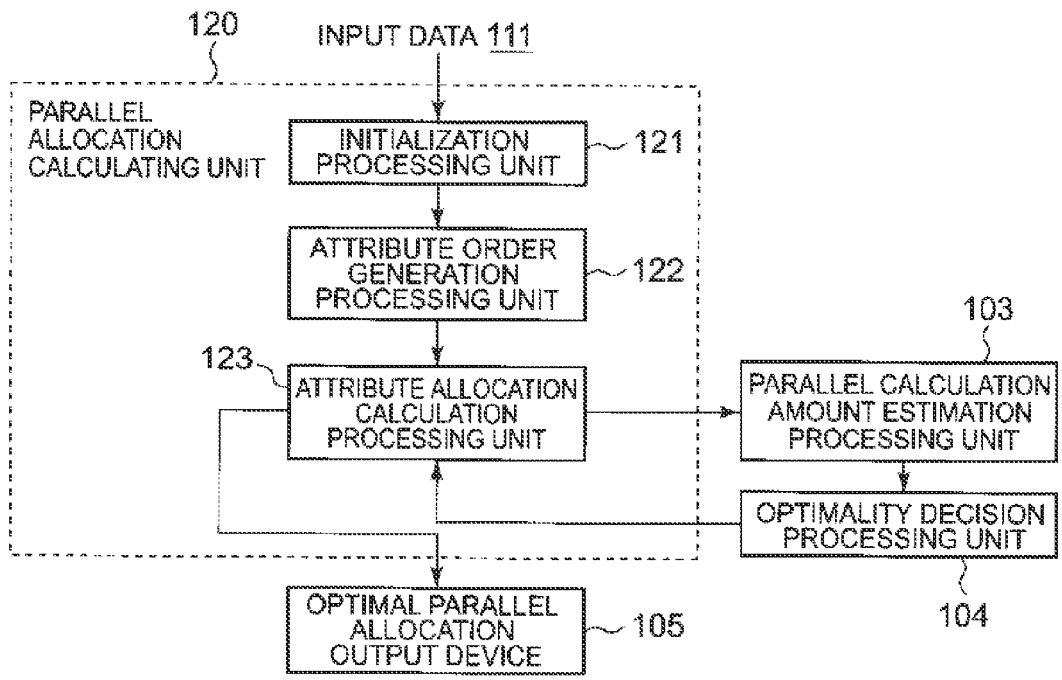

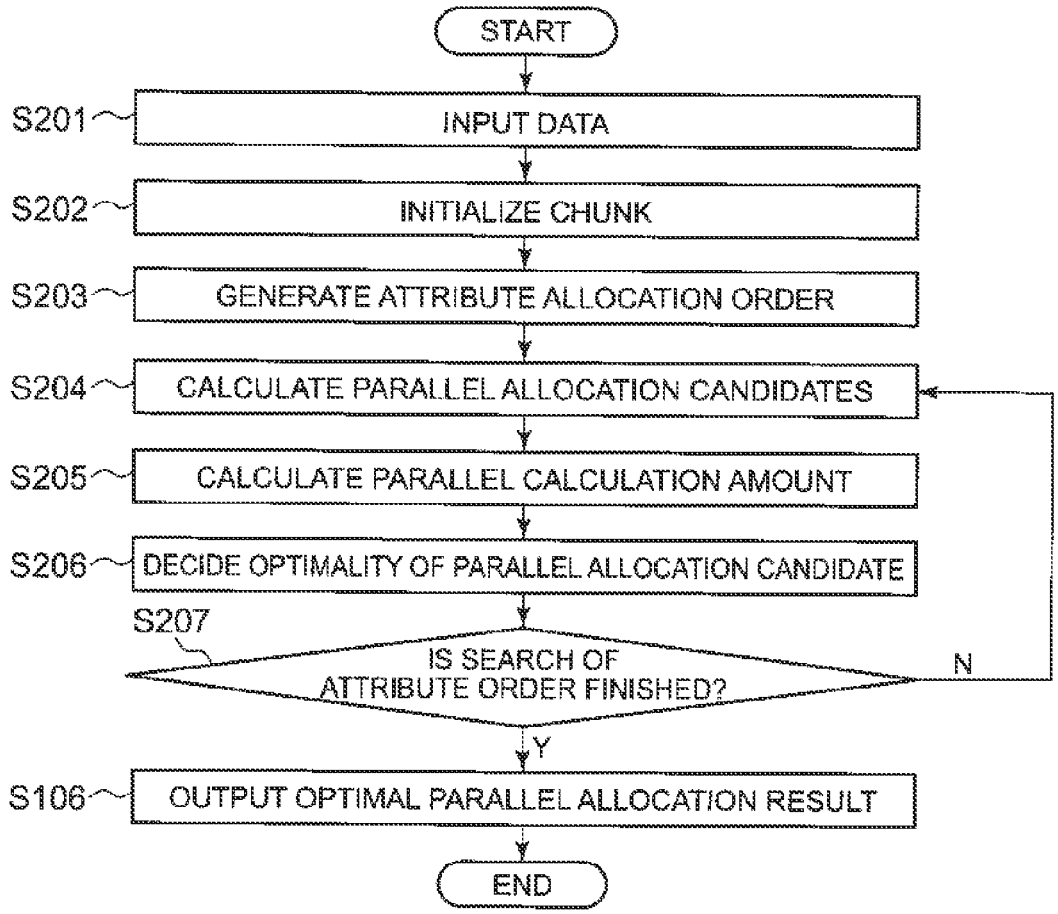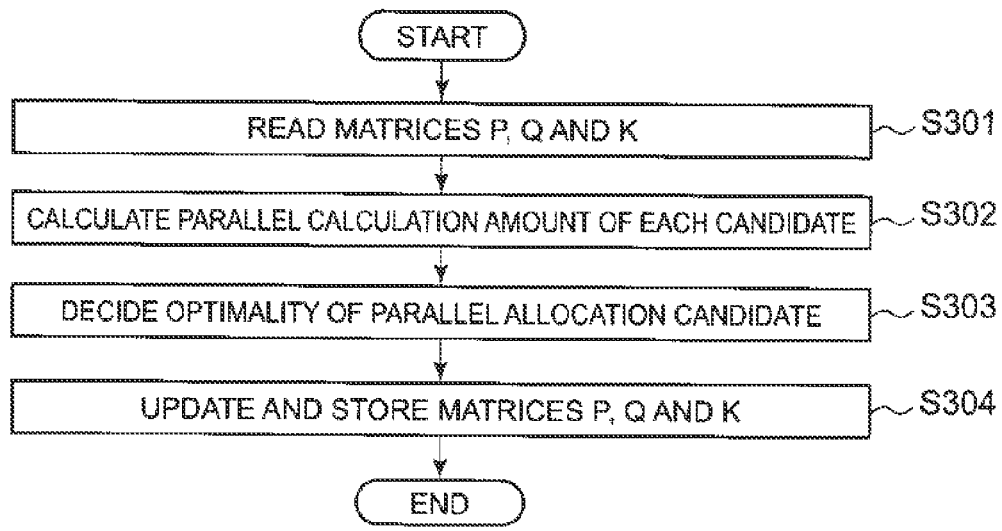

PARALLEL ALLOCATION OPTIMIZATION DEVICE, PARALLEL ALLOCATION OPTIMIZATION METHOD, AND COMPUTER-READABLE RECORDING MEDIUM

BACKGROUND OF THE INVENTION

1. Field of the Invention

The present invention relates to a parallel allocation optimization device, a parallel allocation optimization method and a computer-readable recording medium which optimize data allocated in each parallel processing.

2. Description of Related Art

In recent years, a technique is becoming important which analyzes "sparse" data which is large and in which most elements in data are zero elements such as text word vector data, a disease log (a logical value vector as to whether or not disease is developing) or a purchase history (a logical value vector as to whether or not a product is bought).

An efficient data structure utilizing for sparse data the fact that elements of data are 0 and a calculating technique are studied and developed. Such a data structure is, for example, a sparse data structure which stores positions and values of nonzero elements. Further, this calculating technique is, for example, a sparse matrix operation of only multiplying nonzero elements using the property that 0 is 0 no matter what 0 is multiplied with any number.

Furthermore, in recent years, "lazy update" using sparsity of data in a machine learning field is proposed. This is a technique of increasing a learning processing speed by "delaying" an update of zero elements of data in a learning machine adopting a special parameter optimization rule.

Non Patent Literature (NPTL) 1 describes a method of optimizing a learning machine. Hereinafter, a case will be described as an example where a lazy update rule is applied to a linear discriminant/regression model described in NPTL1. An update rule described in NPTL1 is an update rule without delay. More specifically, the update rule described in NPTL1 optimizes the learning machine by repeating a first updating step of a gradient direction of a loss function and a second updating step of a model regularization function.

According to the update rule described in NPTL1, when data elements are zero, the gradient of the loss function is zero. Hence, when items of data having values of zero are successive, only the second updating step is repeated. In this case, calculation of the second updating step can be essentially executed collectively a plurality of times. Hence, when a lazy update is applied to this processing, an update is not performed while data having zero elements are successive and an update is delayed when data having a nonzero element appears, so that it is possible to collectively perform the second updating step. Consequently, it is possible to substantially reduce the calculation amount.

CITATION LIST

Non Patent Literatures

NPTL 1: John Duchi, Yoram Singer, "Efficient Online and Batch Learning Using Forward Backward Splitting", Journal of Machine Learning Research, p. 2899-2934, 2009

SUMMARY OF THE INVENTION

However, even when a lazy update rule is simply applied to parallelization calculation, it is not necessarily possible to increase the calculation speed. This problem will be described with reference to FIG. 8. FIG. 8 is an explanatory view illustrating data examples of parallel allocation targets. With the example illustrated in FIG. 8, each row in a data table represents data, and each column in the data table represents an attribute value of each data. Further, each data is identified based on a data ID, and each attribute is identified based on an attribute ID.

Hereinafter, when elements (for example, attributes) representing data content are parallelized, an area to which each element is allocated is referred to as a "chunk". That is, each element of data is allocated to each chunk, and each chunk is parallelized. With the example illustrated in FIG. 8, elements of each data are allocated to three chunks.

According to the lazy update rule, a parameter is updated at a position of a nonzero element, so that the calculation amount can be schematically represented as the calculation amount related to non-parallel or parallel illustrated on the right side in FIG. 8.

Meanwhile, data in the third row illustrated in FIG. 8 will be focused upon. Both when this data is non-parallelized and parallelized, the calculation amount is 4. That is, an effect of parallel calculation does not work at all in this case. That is, when a calculation efficiency of a learning rule is increased using a lazy update, if some data is simply parallelized, there is a problem that the calculation efficiency worsens.

It is therefore an object of the present invention to provide a parallel allocation optimization device, a parallel allocation optimization method, and a computer-readable recording medium which can increase a calculation speed of performing parallel calculation using a lazy update rule.

A parallel allocation optimization device according to the present invention has: a parallel allocation calculating unit which calculates a parallel allocation candidate which is an element candidate in target data allocated per processing performed in parallel; a parallel calculation amount estimation processing unit which estimates a calculation amount required for parallel processing when the parallel allocation candidate is allocated, based on a nonzero element count in the target data; and an optimality decision processing unit which decides whether or not the parallel allocation candidate is optimal based on the calculated calculation amount, and allocates an optimal element per processing performed in parallel.

A parallel allocation optimization method according to the present invention includes: calculating a parallel allocation candidate which is an element candidate in target data allocated per processing performed in parallel; estimating a calculation amount required for parallel processing when the parallel allocation candidate is allocated, based on a nonzero element count in the target data; and deciding whether or not the parallel allocation candidate is optimal based on the calculated calculation amount, and allocating an optimal element per processing performed in parallel.

A computer-readable recording medium according to the present invention has a parallel allocation optimizing program recorded thereon which causes a computer to execute: parallel allocation calculation processing of calculating a parallel allocation candidate which is an element candidate in target data allocated per processing performed in parallel; parallel calculation amount estimation processing of estimating a calculation amount required for parallel processing when the parallel allocation candidate is allocated, based on a nonzero element count in the target data; and optimality decision processing of deciding whether or not the parallel allocation candidate is optimal, based on the calculated calculation amount and allocating an optimal element per processing performed in parallel.

According to the present invention, it is possible to increase a calculation speed for performing parallel calculation using a lazy update rule.

BRIEF DESCRIPTION OF THE DRAWINGS

FIG. 1 is a block diagram illustrating an embodiment of a parallel allocation optimization device according to the present invention;

FIG. 2 is a block diagram illustrating another embodiment of the parallel allocation optimization device according to the present invention;

FIG. 5 is a flowchart illustrating another operation example of the parallel allocation optimization device according to the present embodiment;

FIG. 6 is a flowchart illustrating an operation example of a parallel calculation amount estimating unit;

DETAILED DESCRIPTION OF EMBODIMENTS

Figure 3:
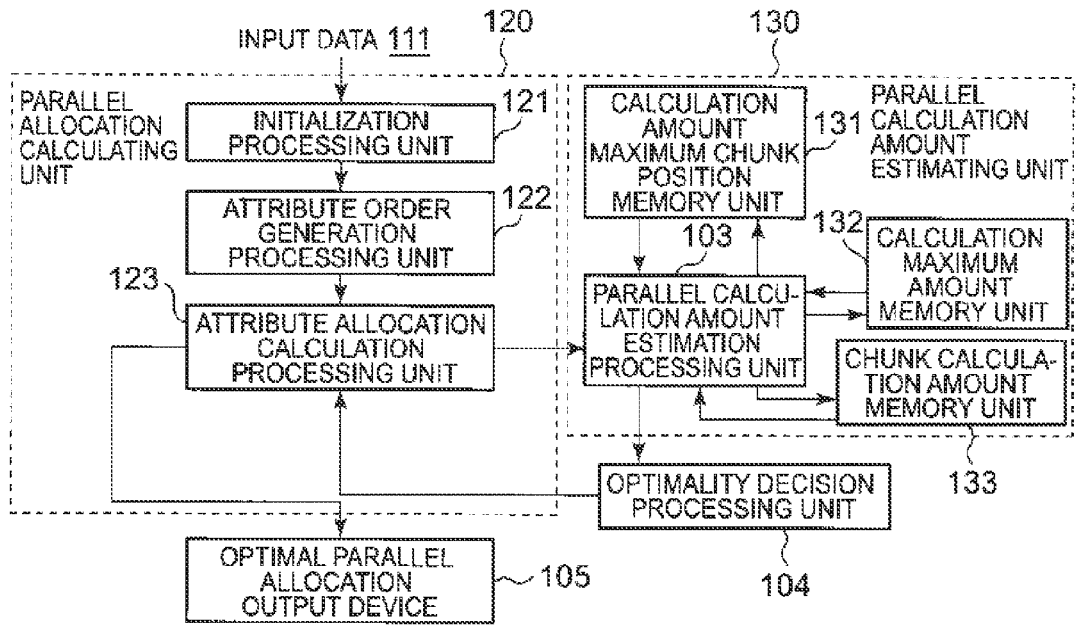
FIG. 3 is a block diagram illustrating yet another embodiment of the parallel allocation optimization device according to the present invention.

Hereinafter, embodiments of the present invention will be described with reference to the drawings. As described above, an area to be allocated upon parallelization is referred to as a "chunk" in the following description. Further, a situation will be described below as an example where attributes of input data are allocated to M chunks. Furthermore, in the following description, parallel allocation means allocation of data attributes. Meanwhile, an allocation target is by no means limited to an attribute, and may be another element which represents data content.

First Embodiment

FIG. 1 is a block diagram illustrating an embodiment of a parallel allocation optimization device according to the present invention. A parallel allocation optimization device 100 according to the present embodiment has a data input device 101, a parallel allocation calculating unit 102, a parallel calculation amount estimation processing unit 103, a optimality decision processing unit 104 and an optimal parallel allocation output device 105. The parallel allocation optimization device 100 receives an input of input data 111, and outputs an optimal parallel allocation result 112. This optimal parallel allocation result 112 is used by, for example, a parallel learning device 200 which uses a lazy update.

Further, the parallel allocation optimization device 100 stores data which is decided to be an optimal allocation target at a current moment and the calculation amount for this allocation in a memory unit (not illustrated).

The data input device 101 receives an input of the multidimensional sparse input data 111. The data input device 101 also receives an input of parameters required for processing in the parallel allocation optimization device 100 together. The input data 111 is identified based on a plurality of elements, and includes, for example, a plurality of attributes.

The parallel allocation calculating unit 102 calculates element candidates (hereinafter, "parallel allocation candidates") in target data to be allocated per processing performed in parallel. The parallel allocation calculating unit 102 generates parallel allocation candidates using an arbitrary method.

The parallel allocation calculating unit 102 may calculate parallel allocation candidates by, for example, generating a permutation of attribute numbers at random and dividing the attribute into M according to the generated permutation. The divided attribute is allocated to each chunk. In addition, another method of calculating parallel allocation candidates will be described below.

The parallel calculation amount estimation processing unit 103 estimates the calculation amount (hereinafter, also referred to as "the parallelization calculation amount") required for parallel processing when a parallel allocation candidate is allocated, based on a nonzero element count in target data. More specifically, the parallel calculation amount estimation processing unit 103 calculates the parallelization calculation amount based on "a nonzero element count in each chunk" (that is, the number of nonzero attributes allocated to each chunk).

Figures 7, 8:
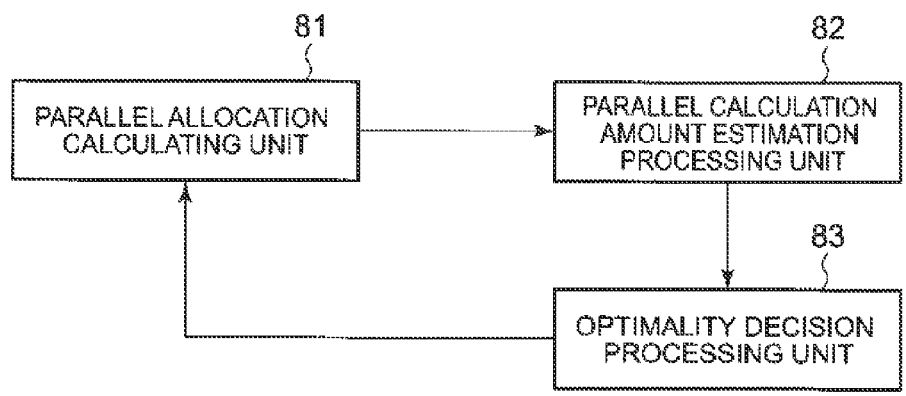
FIG. 7 is a block diagram illustrating an outline of the parallel allocation optimization device according to the present invention.
FIG. 8 is an explanatory view illustrating data examples of parallel allocation targets.

When, for example, matrix data illustrated in FIG. 8 is given, the parallel calculation amount estimation processing unit 103 may calculate the calculation amount using equation 1 shown below.

$$\sum_{n=1}^{N} K_n^* \quad \text{(Equation 1)}$$

$$K_n^* = \max\{K_{n1}, \ldots, K_{nm}\} \quad (m = 1, \ldots, M)$$

In above equation 1, N is the number of items of data, and n=1, ... and N are data IDs. Further, $K_{nm}$ is a nonzero element count of data n in the dimension allocated to a chunk k.

For example, nth data $X_n$=(0.5, 1.0, 0.0, 0.0, 0.0, 0.2) is true, first to third attributes are allocated to the chunk 1, and fourth to six attributes are allocated to the chunk 2. In this case, $K_{n1}$=2, and $K_{n2}$=1 are true.

Above equation 1 means calculating a maximum value of the nonzero element count allocated to each chunk in each step of a parallelized lazy update and calculating the amount obtained by calculating the sum of maximum values of all steps. That is, the parallel calculation amount estimation processing unit 103 calculates per processing the maximum value of the nonzero element count allocated per processing performed in parallel, and estimates the sum of maximum values of all processings performed in parallel as the calculation amount required for parallel processing.

The optimality decision processing unit 104 decides whether or not a parallel allocation candidate is optimal based on the calculated calculation amount, and allocates an optimal element per processing performed in parallel. More specifically, the optimality decision processing unit 104 allocates a parallel allocation candidate of the lowest calculation amount among the parallel allocation candidates calculated by the parallel allocation calculating unit 102 as an optimal element.

The optimality decision processing unit 104 may compare, for example, the calculation amount estimated for optimal parallel allocation which is currently stored in the memory unit (not illustrated) and the calculation amount of parallel allocation calculated by the parallel calculation amount estimation processing unit 103, and store a smaller calculation amount in the memory unit (not illustrated) as current optimal parallel allocation together with the calculation amount.

In addition, an element which is currently stored in the memory unit (not illustrated) is the optimal element in parallel processing, and therefore parallel allocation stored in the memory unit is an element allocated as optimal data.

Further, the optimality decision processing unit 104 outputs the optimal parallel allocation result 112 to the optimal parallel allocation output device 105. The optimality decision processing unit 104 may output the optimal parallel allocation result 112 to the optimal parallel allocation output device 105 when, for example, the calculation amount is smaller than a predetermined value. In addition, the optimality decision processing unit 104 may command the parallel allocation calculating unit 102 to calculate parallel allocation candidates again when the calculation amount is a predetermined value or more.

Further, the optimality decision processing unit 104 may output the optimal parallel allocation result 112 to the optimal parallel allocation output device 105 when, for example, a number of times of commanding the parallel allocation calculating unit 102 to calculate parallel allocation candidates exceeds a predetermined number of times.

Meanwhile, a timing at which the optimal parallel allocation output device 105 outputs the optimal parallel allocation result 112 is by no means limited to the above timing. Alternatively, the optimality decision processing unit 104 may output the optimal parallel allocation result 112 to the optimal parallel allocation output device 105 according to a user's command in response to the decision result.

Next, a method of the parallel allocation calculating unit 102 for calculating parallel allocation candidates will be more specifically described. FIG. 2 is a block diagram illustrating another embodiment of the parallel allocation optimization device according to the present invention. In the parallel allocation optimization device illustrated in FIG. 2, the parallel allocation calculating unit 102 illustrated in FIG. 1 is replaced with a parallel allocation calculating unit 120. In addition, FIG. 2 does not illustrate the data input device 101.

The parallel allocation calculating unit 120 has an initialization processing unit 121, an attribute order generation processing unit 122 and an attribute allocation calculation processing unit 123. The attribute allocation calculation processing unit 123 is connected to the parallel calculation amount estimation processing unit 103 and the optimality decision processing unit 104.

The initialization processing unit 121 initializes M chunks to empty states.

The attribute order generation processing unit 122 generates an attribute order for allocating attributes to chunks. The attribute order generation processing unit 122 may generate the attribute order using an arbitrary method. The attribute order generation processing unit 122 may use, for example, a method of generating the attribute order at random, a method of ordering attributes in order from a higher nonzero element count and a method of ordering attributes in order from a lower nonzero element count.

The attribute allocation calculation processing unit 123 generates allocation candidates with respect to chunks according to the order of an attribute. The attribute allocation calculation processing unit 123 may generate allocation candidates one by one or may collectively generate a plurality of allocation candidates.

A situation will be supposed as an example where allocation of an attribute 1 to an attribute d−1 is finished and an attribute d is allocated. In this case, the attribute d is allocated to one of the chunk 1 to a chunk M, so that M allocation candidates are generated.

Subsequently, the parallel calculation amount estimation processing unit 103 calculates the parallelization calculation amount using above equation 1 for the generated candidates. Further, the optimality decision processing unit 104 compares parallelization calculation amounts of the generated M candidates, and stores parallel allocation of the smallest calculation amount in the memory unit (not illustrated) as optimal allocation. Consequently, it is possible to increase a calculation speed for parallel calculation using a lazy update rule.

In addition, a method of the parallel calculation amount estimation processing unit 103 for calculating the parallelization calculation amount is by no means limited to the method using above equation 1. When equation 1 is used, a max operation is required. Hence, a method of more efficiently calculating the parallelization calculation amount will be described below. FIG. 3 is a block diagram illustrating yet another embodiment of the parallel allocation optimization device according to the present invention.

The parallel allocation optimization device illustrated in FIG. 3 further has a calculation amount maximum chunk position memory unit 131, a calculation maximum amount memory unit 132 and a chunk calculation amount memory unit 133 in the configuration of the parallel allocation optimization device illustrated in FIG. 2. That is, the parallel allocation optimization device illustrated in FIG. 3 employs a configuration where the parallel calculation amount estimation processing unit 103 illustrated in FIG. 2 is replaced with a parallel calculation amount estimating unit 130. Information stored in the calculation amount maximum chunk position memory unit 131, the calculation maximum amount memory unit 132 and the chunk calculation amount memory unit 133 is updated by the parallel calculation amount estimation processing unit 103.

The calculation amount maximum chunk position memory unit 131 stores a binary matrix of the number of items of data (N)×the number of chunks (M). Hereinafter, this matrix is referred to as "P". A nm element of the matrix P is 1 when $K_{nm}=\max\{K_{n1}, \ldots \text{ and } K_{nM}\}$ is true, and is 0 other than when $K_{nm}=\max\{K_{n1}, \ldots \text{ and } K_{nM}\}$ is true. That is, the calculation amount maximum chunk position memory unit 131 stores information for specifying the chunk m of the highest nonzero element count $K_{nm}$ per target data n.

The calculation maximum amount memory unit 132 stores a N dimensional vector. Hereinafter, this vector is referred to as "Q". A n element of Q is $\max\{K_{n1}, \ldots \text{ and } K_{nM}\}$. That is, the calculation maximum amount memory unit 132 stores per target data the nonzero element count $K_{nm}$ of the highest nonzero element count $K_{nm}$ in the chunk m to which an element in the target data n is allocated.

The chunk calculation amount memory unit 133 stores the binary matrix of the number of items of data (N)×the number of chunks (M). Hereinafter, this matrix is referred to as "K". A nm element of the matrix K is a nonzero element count ($K_{nm}$) having the attribute of the data n allocated to the chunk m. That is, the chunk calculation amount memory unit 133 stores the nonzero element count $K_{nm}$ in each target data n allocated to each chunk m.

Hereinafter, a situation will also be supposed where allocation of the attribute 1 to the attribute d−1 is finished and the attribute d is allocated. That is, M allocation candidates are generated. Meanwhile, a situation will be studied where the parallel allocation calculating unit 120 allocates the attribute d to the chunk m. In addition, the following subscript (d) means that the dth update is performed according to an attribute order.

When $X_{nd}$ (that is, a dth attribute value of the data n) is zero, $K_{nm(d)}$ of all chunks does not change (that is, satisfies $K_{nm(d)}=K_{nm(d-1)}$). Consequently, it is possible to skip calculation. By contrast with this, when $X_{nd}$ is nonzero, $K_{nm(d)}=K_{nm(d-1)}+1$ is true.

Meanwhile, whether a data element is "zero or nonzero" is important. That is, when $K_{nm(d-1)}=\max\{K_{n1(d-1)},\ldots$ and $K_{nM(d-1)}\}$ is true, it is guaranteed that $K_{nm(d)}=\max\{K_{n1(d)},\ldots$ and $K_{nM(d)}\}$ is true. By contrast with this, when $K_{nm(d-1)}=\max\{K_{n1(d-1)},\ldots$ and $K_{nM(d-1)}\}$ is not true, it is guaranteed that $K_{nm(d)}$ is $\max\{K_{n1(d-1)},\ldots$ and $K_{nM(d-1)}\}$ at maximum.

The calculation amount for the attribute allocated to the chunk m can be calculated using the matrices and a vector stored in the calculation amount maximum chunk position memory unit 131, the calculation maximum amount memory unit 132 and the chunk calculation amount memory unit 133 illustrated in FIG. 3. More specifically, the parallel calculation amount estimation processing unit 103 can calculate the calculation amount for the chunk m by adding the number of rows (that is, data identified based on data IDs) in which $X_{nd}$ is nonzero among rows in which elements in the mth column in the matrix P are 1, to the sum of each element included in the vector Q.

In addition, when it is decided that it is optimal to allocate the dth attribute to the mth chunk, the parallel calculation amount estimation processing unit 103 updates P, Q and K according to the following procedure.

First, $K_{nm(d)}=K_{nm(d-1)}+B(X_{nd})$ is updated. Meanwhile, B is the function of returning 1 when an argument is nonzero, and returning 0 when the argument is 0. Next, when $P_{nm(d-1)}=1$ is true, $P_{nm(d)}=1$, $P_{nm'(d)}=0$ (m'≠m) and $Q_{n(d)}=Q_{n(d-1)}+1$ are updated. Meanwhile, when $P_{nm(d-1)}=0$ is true and when $K_{nm(d-1)}=Qn_{(d-1)}-1$ is true, $P_{nm(d)}=1$ is updated.

The parallel allocation calculating unit 102, the parallel calculation amount estimation processing unit 103 and the optimality decision processing unit 104 are realized by the CPU of a computer which operates according to a program (parallel allocation optimizing program). For example, the program is stored in the memory unit (not illustrated) of the parallel allocation optimization device 100, and the CPU may read this program and operate as the parallel allocation calculating unit 102, the parallel calculation amount estimation processing unit 103 and the optimality decision processing unit 104 according to the program. Further, the parallel allocation calculating unit 102, the parallel calculation amount estimation processing unit 103 and the optimality decision processing unit 104 may be each realized by dedicated hardware.

Furthermore, the parallel allocation calculating unit 120 (more specifically, the initialization processing unit 121, the attribute order generation processing unit 122 and the attribute allocation calculation processing unit 123) is also realized by the CPU of the computer which operates according to the program (parallel allocation optimizing program). Still further, the initialization processing unit 121, the attribute order generation processing unit 122 and the attribute allocation calculation processing unit 123 may be each realized by dedicated hardware.

Moreover, the calculation mount maximum chunk position memory unit 131, the calculation maximum amount memory unit 132 and the chunk calculation amount memory unit 133 are realized by, for example, a magnetic disk.

Figure 4:
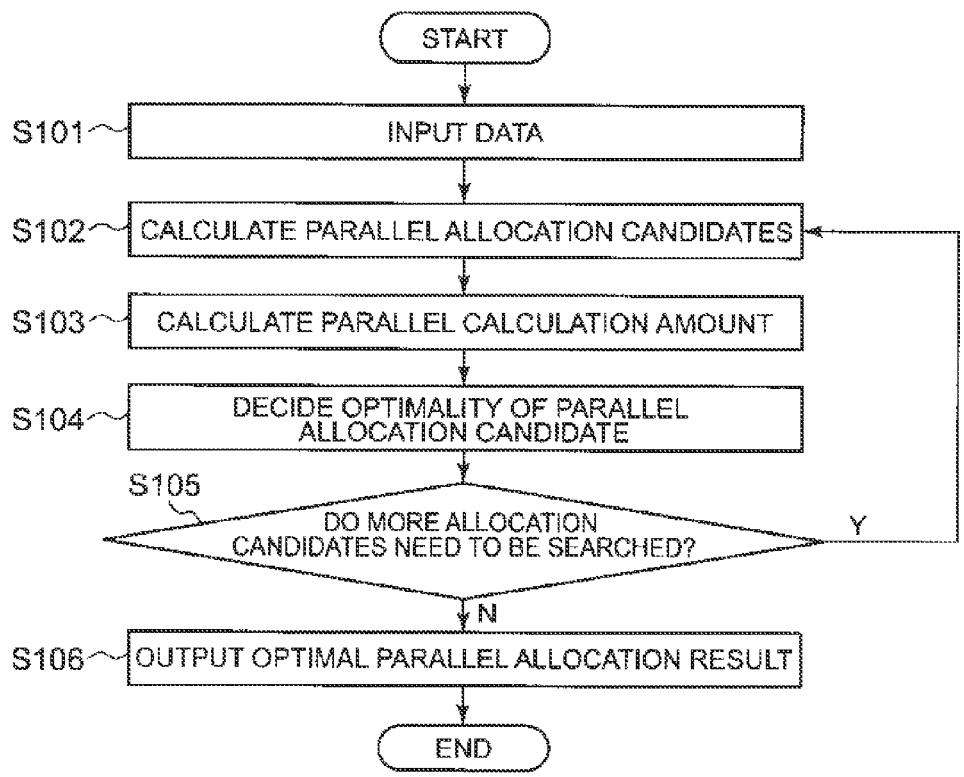
FIG. 4 is a flowchart illustrating an operation example of the parallel allocation optimization device according to the present embodiment.

Next, an operation of the parallel allocation optimization device 100 according to the present embodiment will be described. FIG. 4 is a flowchart illustrating an operation example of the parallel allocation optimization device according to the present embodiment.

The data input device 101 receives an input of the input data 111 (step S101). The parallel allocation calculating unit 102 calculates parallel allocation candidates (step S102). The parallel calculation amount estimation processing unit 103 calculates the calculation amount for the calculated parallel allocation candidate (step S103). The optimality decision processing unit 104 decides optimality of the parallel allocation candidate, and updates the current optimal parallel allocation (step S104).

The optimality decision processing unit 104 decides whether or not a parallel allocation candidate is further generated (step S105). When it is decided that the parallel allocation candidate is further generated (Yes in step S105), processing subsequent to step S102 is repeated. By contrast with this, when it is decided that the parallel allocation candidate is further generated (Yes in step S105), the optimal parallel allocation output device 105 outputs the optimal parallel allocation result 112 (S106).

FIG. 5 is a flowchart illustrating another operation example of the parallel allocation optimization device according to the present embodiment. The flowchart illustrated in FIG. 5 indicates an operation when the parallel allocation calculating unit 102 illustrated in FIG. 1 is replaced with the parallel allocation calculating unit 120 illustrated in FIG. 2.

The data input device 101 receives an input of the input data 111 (step S201). The initialization processing unit 121 initializes a chunk used for parallelization to an empty state (step S202). The attribute order generation processing unit 122 generates the attribute allocation order (step S203). The parallel allocation calculating unit 123 calculates the parallel allocation candidate according to the generated attribute order (step S204).

The parallel calculation amount estimation processing unit 103 calculates the calculation amount for the calculated parallel allocation candidate (step S205). The optimality decision processing unit 104 decides the optimality of the parallel allocation candidate, and updates the current optimal parallel allocation (step S206).

The optimality decision processing unit 104 decides whether or not all attributes are allocated to chunks according to the generated attribute order (step S207). That is, the optimality decision processing unit 104 decides whether or not search for the attribute order is finished. When it is decided that allocation is not yet finished (No in step S207), processing subsequent to step S204 is repeated. By contrast with this, when allocation is finished (Yes in step S207), the optimal parallel allocation output device 105 outputs the optimal parallel allocation result 112 (S208).

FIG. 6 is a flowchart illustrating an operation example of the parallel calculation amount estimating unit 130. This operation example can be replaced with the operation in step S205 in FIG. 5.

The parallel calculation amount estimation processing unit 103 reads the matrix P, the vector Q and the matrix K from the calculation amount maximum chunk memory unit 131, the calculation maximum amount memory unit 132 and the chunk calculation amount memory unit 133 (step S301). The parallel calculation amount estimation processing unit 103 calculates the calculation amount for each allocation candidate using P, Q and K (step S302).

The parallel calculation amount estimation processing unit 103 decides optimality of the parallel allocation candidate, and updates the current optimal parallel allocation (step S303). The parallel calculation amount estimation processing unit 103 updates the matrix P, the vector Q and the matrix K, and stores each value in the calculation amount maximum chunk memory unit 131, the calculation maximum amount memory unit 132 and the chunk calculation amount memory unit 133.

As described above, according to the present embodiment, the parallel allocation calculating unit 102 calculates an element candidate (parallel allocation candidate) in target data allocated per processing performed in parallel, based on a nonzero element count, the parallel calculation amount estimation processing unit 103 estimates the calculation amount required for parallel processing when the parallel allocation candidate is allocated, and the optimality decision processing unit 104 decides whether or not the parallel allocation candidate is optimal based on the calculated calculation amount and allocates the optimal element per processing performed in parallel. Consequently, it is possible to increase a calculation speed for parallel calculation using a lazy update rule.

More specifically, the parallel calculation amount estimation processing unit 103 calculates per processing the maximum value of the nonzero element count allocated per processing performed in parallel using above equation 1, and estimates the sum of maximum values of all processings performed in parallel as the calculation amount required for parallel processing. Further, the optimality decision processing unit 104 allocates the parallel allocation candidate of the smallest calculation amount among the calculated parallel allocation candidates as the optimal element.

Thus, each data element is allocated by focusing upon the nonzero element count and estimating the calculation amount required for parallel processing, so that it is possible to increase the calculation speed for performing parallel calculation using a lazy update rule.

EXAMPLES

Although the present invention will be described below based on a specific example, the scope of the present invention is by no means limited to the following content. The example will be described where a parallel allocation optimization device according to the present invention is appropriated for failure diagnosis based on sensor data of a car.

Multiple electrical signal values can be acquired from a car in which a malfunction takes place. This electrical signal value is, for example, a control signal and is a binary signal, and therefore most of elements are zero elements. For a method of specifying the type of failure from this electrical signal value, a method is adopted of, for example, collecting past failure examples for which causes of failure have been found, learning a discriminant model and predicting the cause of data of a car in which failure newly takes place. To learn the discriminant model, it is necessary to learn multiple electrical signal values acquired from multiple cars, and improvement of calculation efficiency is an important task.

By using the parallel allocation optimization device according to the present invention and parallelizing a learning rule of the discriminant model using a lazy update described in NPTL1, it is possible to increase the learning speed of a failure diagnosis model (discriminant model) of the above car. With the present example, a data ID in input data 111 corresponds to a past failure example, and an attribute ID corresponds to an electrical signal ID.

Hereinafter, the operation according to the present example will be described based on a configuration of the parallel allocation optimization device illustrated in FIG. 2.

The input data 111 is inputted together with past failure example data assuming that the number of times of parallelization M is, for example, 3. The initialization processing unit 121 initializes an allocation area on a memory of the attribute ID to an empty state assuming that M=3 is true.

Next, the attribute order generation processing unit 122 generates the permutation of a length D (D is the number of attribute IDs) at random as an attribute order. Hereinafter, the order of the permutation is represented as "1 to D", and an electrical signal d corresponds to the order number.

The attribute allocation calculation processing unit 123 allocates the attribute ID to a chunk one by one for 1 to D according to the generated permutation. When allocation of electrical signals up to the electrical signal d−1 is finished at a current moment, the attribute allocation calculation processing unit 123 generates an allocation candidate when the attribute d is allocated to three chunks.

The parallel calculation amount estimation processing unit 103 estimates the parallelization calculation amount for the three allocation candidates using above equation 1. Further, the optimality decision processing unit 104 specifies the allocation candidate of the smallest parallelization calculation amount among the three allocation candidates.

The above processing is repeated until all electrical signal IDs are allocated to chunks according to the attribute order. After the processing is finished, the optimal parallel allocation output device 105 outputs a parallel allocation result.

For example, this parallel allocation is applied to a learning rule using a lazy update described in NPTL1. In this case, the attribute ID allocated in each parallel chunk is updated (more specifically, an update of a loss gradient and an update related to regularization). When one step update processing is performed for all chunks, all results are integrated and parameters are updated.

According to the above procedure, it is possible to solve the problem that efficiency worsens when data illustrated in FIG. 8 is parallelized. In case of the present example, it is possible to perform parallel calculation of the failure diagnosis model of a car at a high speed.

Next, an outline of the present invention will be described. FIG. 7 is a block diagram illustrating the outline of the parallel allocation optimization device according to the present invention. A parallel allocation optimization device according to the present invention has: a parallel allocation calculating unit 81 (for example, parallel allocation calculating unit 102) which calculates a parallel allocation candidate which is an element (for example, attribute) candidate in target data allocated per processing performed in parallel; a parallel calculation amount estimation processing unit 82 (for example, parallel calculation amount estimation processing unit 103) which estimates the calculation amount required for parallel processing when the parallel allocation candidate is allocated, based on a nonzero element count in the target data; and an optimality decision processing unit 83 (for example, optimality decision processing unit 104) which decides whether or not a parallel allocation candidate is optimal based on the calculated calculation amount, and allocates an optimal element per processing performed in parallel.

According to such a configuration, it is possible to increase a calculation speed for parallel calculation using a lazy update rule.

Further, the parallel calculation amount estimation processing unit 82 may calculate per processing a maximum value (for example, $K^*_n = \max\{K_{n1}, \ldots \text{ and } K_{nm}\}$) of the nonzero element count allocated per processing performed in parallel, and estimate the sum (for example, $\Sigma K^*_n$) of maximum values of all processings performed in parallel as the calculation amount required for parallel processing. Furthermore, the optimality decision processing unit 83 may allocate the parallel allocation candidate of the smallest calculation amount among the calculated parallel allocation candidates as an optimal element.

Still further, the parallel allocation calculating unit 81 may calculate a parallel allocation candidate by generating an attribute order used to allocate elements and allocating each element to a chunk according to this attribute order. Moreover, the parallel calculation amount estimation processing unit 82 may estimate per chunk the calculation amount when an element is allocated to a chunk according to the attribute order. Moreover, the optimality decision processing unit 83 may allocate an element to a chunk of the lowest calculation amount.

Further, the parallel allocation optimization device has: a calculation maximum amount memory unit (for example, calculation maximum amount memory unit 132) which stores per target data a nonzero element count in the chunk of the highest nonzero element count (for example, $K_{nm}$) among chunks to which elements in the target data (for example, n) are allocated (for example, stores a vector Q); and a calculation amount maximum chunk position memory unit (for example, calculation amount maximum chunk position memory unit 131) which stores information (for example, information identified based on 1/0) for specifying the chunk of the highest nonzero element count per target data (for example, stores the matrix P). Further, the parallel calculation amount estimation processing unit 82 may calculate the calculation amount by adding the number of items of target data in which nonzero elements are allocated to the chunk of the highest nonzero element count specified based on information stored in the calculation amount maximum chunk position memory unit, to the sum of the nonzero element counts stored in the calculation maximum amount memory unit.

Further, the parallel allocation optimization device may have a chunk calculation amount memory unit (for example, chunk calculation amount memory unit 133) which stores the nonzero element count (for example, $K_{nm}$) in each target data (for example, n) allocated to each chunk (for example, m) (for example, stores the matrix K).

Furthermore, the parallel calculation amount estimation processing unit 82 may add the nonzero element count newly allocated to the nonzero element count in each target data stored in the chunk calculation amount memory unit (for example, $K_{nm(d)}=K_{nm(d-1)}+B(X_{nd})$) to update.

Still further, the parallel calculation amount estimation processing unit 82 may update information stored in the calculation amount maximum chunk position memory unit to information which can specify that a chunk has the highest nonzero element count (for example, $P_{nm(d)}=1$ and $P_{nm'(d)}=0$ (m'≠m)) when the nonzero element is allocated to the chunk of the highest nonzero element count (for example, $P_{nm(d-1)}=1$), and add 1 to the nonzero element count in target data stored in the calculation maximum amount memory unit (for example, $Q_{n(d)}=Q_{n(d-1)}+1$) and, when the nonzero element count is not allocated to the chunk of the highest nonzero element count (for example, $P_{nm(d-1)}=0$) and when a value obtained by adding 1 to the nonzero element count in the target data stored in the calculation maximum amount memory unit is equal to the nonzero element count in the target data stored in the chunk calculation amount memory unit (for example, $K_{nm(d-1)}=Qn_{(d-1)}-1$), update information stored in the calculation amount maximum chunk position memory unit to information which can specify that the allocated chunk has the highest nonzero element count (for example, $P_{nm(d)}=1$).

Part or the entirety of the above embodiment can be described as in the following notes and, however, is by no means limited to the following notes.

(Note 1) A parallel allocation optimizing program causes a computer to execute: parallel allocation calculation processing of calculating a parallel allocation candidate which is an element candidate in target data allocated per processing performed in parallel; parallel calculation amount estimation processing of estimating a calculation amount required for parallel processing when the parallel allocation candidate is allocated, based on a nonzero element count in the target data; and optimality decision processing of deciding whether or not the parallel allocation candidate is optimal based on the calculated calculation amount, and allocating an optimal element per processing performed in parallel.

(Note 2) A parallel allocation optimizing program according to note 1 causes the computer to, in parallel calculation amount estimation processing, calculate per processing a maximum value of the nonzero element count allocated per processing performed in parallel, estimate a sum of maximum values of all processings performed in parallel as a calculation amount required for parallel processing, and allocate a parallel allocation candidate of a smallest calculation amount among the calculated parallel allocation candidates as an optimal element.

The present invention is suitably applied to a parallel allocation optimization device which optimizes data allocated in each parallel processing.

What is claimed is:

1. A parallel allocation optimization device comprising:
    a parallel allocation calculating unit which calculates a parallel allocation candidate which is an element candidate in target data allocated per processing performed in parallel;
    a parallel calculation amount estimation processing unit which estimates a calculation amount required for parallel processing when the parallel allocation candidate is allocated, based on a nonzero element count in the target data, wherein the parallel calculation amount estimation processing unit further calculates per processing a maximum value of the nonzero element count allocated per processing performed in parallel, and estimates a sum of maximum values of all processing performed in parallel as a calculation amount required for parallel processing; and
    an optimality decision processing unit which decides whether or not the parallel allocation candidate is optimal based on the calculated calculation amount, wherein the optimality decision processing unit allocates a parallel allocation candidate by comparing the estimated calculation amount currently stored in a memory and the calculation amount of parallel allocation calculated by the parallel calculation amount estimation processing unit and selects the smallest calculation amount among calculated parallel allocation candidates as a current optimal element.

2. The parallel allocation optimization device according to claim 1, wherein
    the parallel allocation calculating unit calculates a parallel allocation candidate by generating an attribute order used to allocate an element, and allocating each element to a chunk according to the attribute order;
    the parallel calculation amount estimation processing unit estimates per chunk a calculation amount when the element is allocated to the chunk according to the attribute order; and the optimality decision processing unit allocates the element to a chunk of the smallest calculation amount.

3. The parallel allocation optimization device according to claim 1, further comprising:
   a calculation maximum amount memory unit which stores per target data a nonzero element count in a chunk of a highest nonzero element count among chunks to which an element in the target data is allocated; and
   a calculation amount maximum chunk position memory unit which stores information for specifying a chunk of a highest nonzero element count per target data,
   wherein the parallel calculation amount estimation processing unit calculates a calculation amount by adding a number of items of target data in which a nonzero element is allocated to the chunk of the highest nonzero element count specified based on information stored in the calculation amount maximum chunk position memory unit, to a sum of nonzero element counts stored in the calculation maximum amount memory unit.

4. The parallel allocation optimization device according to claim 3, further comprising a chunk calculation amount memory unit which stores a nonzero element count in each target data allocated to each chunk, wherein
   the parallel calculation amount estimation processing unit adds a nonzero element count which is newly allocated to the nonzero element count in each target data stored in the chunk calculation amount memory unit to update, and, when the nonzero element is allocated to the chunk of the highest nonzero element count, updates information stored in the calculation amount maximum chunk position memory unit to information which can specify that the chunk comprises the highest nonzero element count and adds 1 to a nonzero element count of target data stored in the calculation maximum amount memory unit; and
   when the nonzero element is not allocated to the chunk of the highest nonzero element count and when a value obtained by adding 1 to the nonzero element count of the target data stored in the calculation maximum amount memory unit is equal to the nonzero element count in the target data stored in the chunk calculation amount memory unit, the parallel calculation amount estimation processing unit updates information stored in the calculation amount maximum chunk position memory unit to information which can specify that the allocated chunk comprises the highest nonzero element count.

5. A parallel allocation optimization method comprising:
   calculating a parallel allocation candidate which is an element candidate in target data allocated per processing performed in parallel;
   estimating a calculation amount required for parallel processing when the parallel allocation candidate is allocated, based on a nonzero element count in the target data; and
   deciding whether or not the parallel allocation candidate is optimal based on the calculated calculation amount, wherein,
   the estimating further comprises calculating per processing a maximum value of the nonzero element count allocated per processing performed in parallel, and estimating a sum of maximum values of all processing performed in parallel as a calculation amount required for parallel processing, and
   the deciding further comprises allocating a parallel allocation candidate by comparing the estimated calculation amount currently stored in a memory and the calculated calculation amount of parallel allocation and selecting the smallest calculation amount among calculated parallel allocation candidates as a current optimal element.

6. A non-transitory computer-readable recording medium having a parallel allocation optimizing program recorded thereon causing a computer to execute:
   parallel allocation calculation processing of calculating a parallel allocation candidate which is an element candidate in target data allocated per processing in parallel;
   parallel calculation amount estimation processing of estimating a calculation amount required for parallel processing when the parallel allocation candidate is allocated, based on a nonzero element count in the target data, wherein the parallel calculation amount estimation processing further comprises calculating per processing a maximum value of the nonzero element count allocated per processing performed in parallel and estimating a sum of maximum values of all processing performed in parallel as a calculation amount required for parallel processing; and
   optimality decision processing of deciding whether or not the parallel allocation candidate is optimal, based on the calculated calculation amount, wherein the optimality decision processing further comprises allocating a parallel allocation candidate by comparing the estimated calculation amount currently stored in a memory and the calculated calculation amount of parallel allocation and selecting the smallest calculation amount among calculated parallel allocation candidates as a current optimal element.

* * * * *